US005833223A

United States Patent [19]

Furuuchi

[11] Patent Number: 5,833,223

[45] Date of Patent: Nov. 10, 1998

[54] CLAMPING APPARATUS WITH A GEAR REDUCER

[75] Inventor: Hiroyuki Furuuchi, Higashiosaka, Japan

[73] Assignee: Kabushiki Kaisha Kyoei Seiko, Osaka, Japan

[21] Appl. No.: 803,443

[22] Filed: Feb. 20, 1997

[30] Foreign Application Priority Data

Feb. 23, 1996 [JP] Japan .................................... 8-036655
Jul. 30, 1996 [JP] Japan .................................... 8-200302

[51] Int. Cl.[6] ...................................................... B23Q 3/02

[52] U.S. Cl. ............................................. 269/93; 269/225

[58] Field of Search ................................ 269/93, 47, 89, 269/95, 225, 235, 99, 100, 246; 254/29 A; 279/2.2, 33

[56] References Cited

U.S. PATENT DOCUMENTS 3,172,654 3/1965 Daniel et al. ............................ 269/93
3,194,548 7/1965 Zwick ....................................... 269/93
5,110,099 5/1992 Shirakawa ................................ 269/93
5,247,846 9/1993 Grossmann et al. ...................... 269/93
5,499,802 3/1996 Haberle ................................... 269/235
5,527,015 6/1996 Percival-Smith ...................... 254/29 A

*Primary Examiner*—David A. Scherbel
*Assistant Examiner*—Lee Wilson
*Attorney, Agent, or Firm*—Nikaido, Marmelstein, Murray & Oram LLP

[57] ABSTRACT

An apparatus for clamping a work piece on a mounting table includes a driving device mounted inside of a casing, a gear reducer connected to an output shaft of the driving device for reducing the rotational speed of the driving device, a rotatable member being rotatable by a power taking-off mechanism connected to the gear reducer, and a detent member screwably engaged with a rotatable member, in which the detent member is outwardly and inwardly movable with regard to the rotatable member by the rotation of the rotatable member to press the work piece on the mounting table at the time of that the detent member is fixed on the mounting table so as not to be rotated.

13 Claims, 7 Drawing Sheets

CLAMPING APPARATUS WITH A GEAR REDUCER

BACKGROUND OF THE INVENTION

This invention relates to a clamping apparatus for fixing a work piece such as a die to a mounting table such as a bolster of a machine tool, and more particularly to a clamping apparatus with a gear reducer.

Conventionally, the work piece such as the die on the bolster of the machine tool such as a press machine is fixed in position by a bolt member with its lower end engaged with a T-slot formed in the bolster, and a nut member. In this arrangement, the nut member is manually tightened or loosened by using a hand tool such as a spanner or the like. However, this operation has to be manually made, and therefore is relatively troublesome and time consuming.

To promptly and smoothly tighten or loosen the nut member, an automatic tightening device such as a portable torque wrench may be used. The automatic tightening device of this type includes a driving means such as an air motor, and an anvil rotatable via the impact of the hammer effected by the rotation of the driving means. With this arrangement, the bolt member or the nut member is rotated via predetermined tightening torque effected by the impact of the hammer.

However, the automatic tightening device of this type is disadvantageous in the fact that, since it is designed to tighten the work piece via the impact, such impact is likely to generate an excessive noise, and damage some parts and/or cause the abrasion of the parts, and consequently weaken the durability of the device.

In addition, the space for using the tightening device is inherently limited by the adjacent dies or the like. Under this condition, a tightening device of a reduced dimension is required.

It is an object of the present invention to provide a clamping apparatus which can reduce the noise generated during the clamping operation.

It is a further object of the present invention to provide a clamping apparatus which can be used for a prolonged period of time.

It is another object of the present invention to provide a clamping apparatus which can be installed in a limited place.

SUMMARY OF THE INVENTION

In accordance with the present invention, an apparatus for clamping a work piece on a mounting table includes a driving means mounted inside of a casing, a gear reducer connected to an output shaft of the driving means for reducing the rotational speed of the driving means, a rotatable member being rotatable by a power taking-off means connected to the gear reducer, and a detent member screwably engaged with a rotatable member, in which the detent member is outwardly and inwardly movable with regard to the rotatable member by the rotation of the rotatable member to press the work piece on the mounting table at the time of that the detent member is fixed on the mounting table so as not to be rotated.

With this arrangement, once the driving means is actuated, the rotational torque is transferred via the gear reducer to the rotatable member. Since the detent member is fixed to the mounting table so as not to be rotated, it is moved inwardly or outwardly via the screwing motion between the detent member and the rotatable member by the rotation of the rotatable member. When the detent member is moved away from the rotatable member, the work piece mounted on the mounting table is pressed and fixed in position. On the contrary, when the detent member is moved into the rotatable member, the work piece is released from the clamped state.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

First embodiment

Figure 3A:
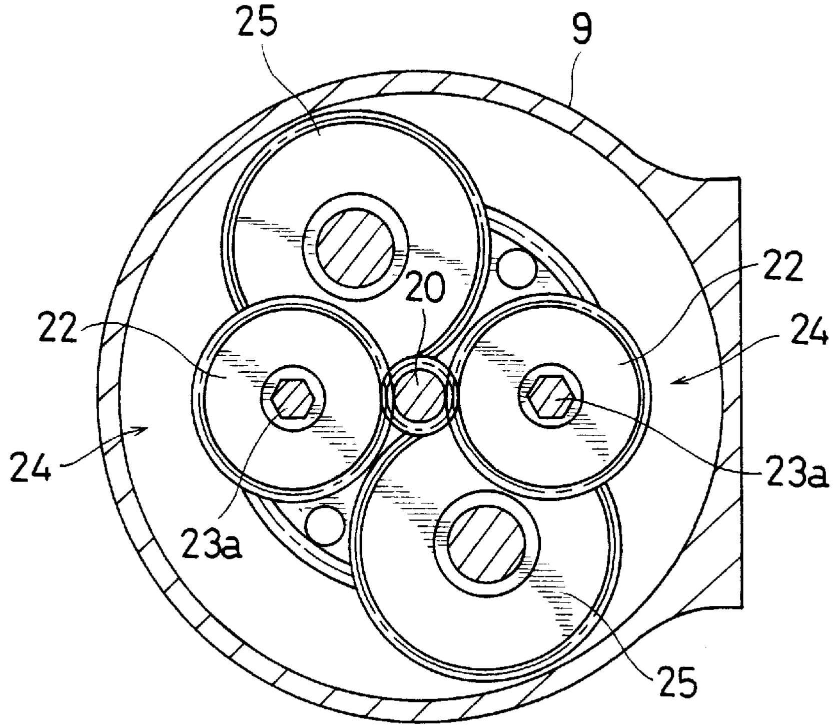
FIG. 3A is a cross section taken along a line of I—I of FIG. 1.
Figure 3B:
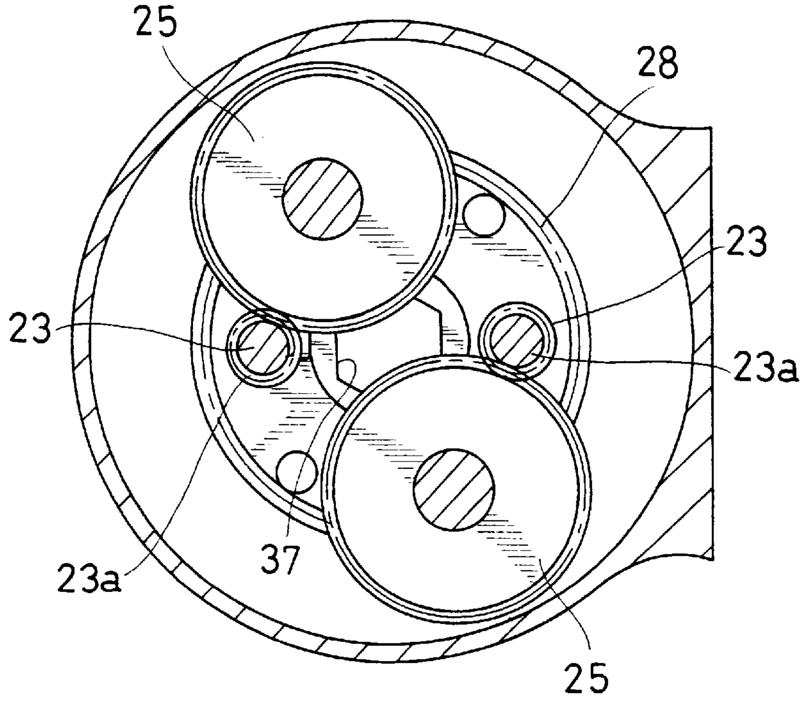
FIG. 3B is a cross section taken along a line of II—II of FIG. 1.
Figure 4:
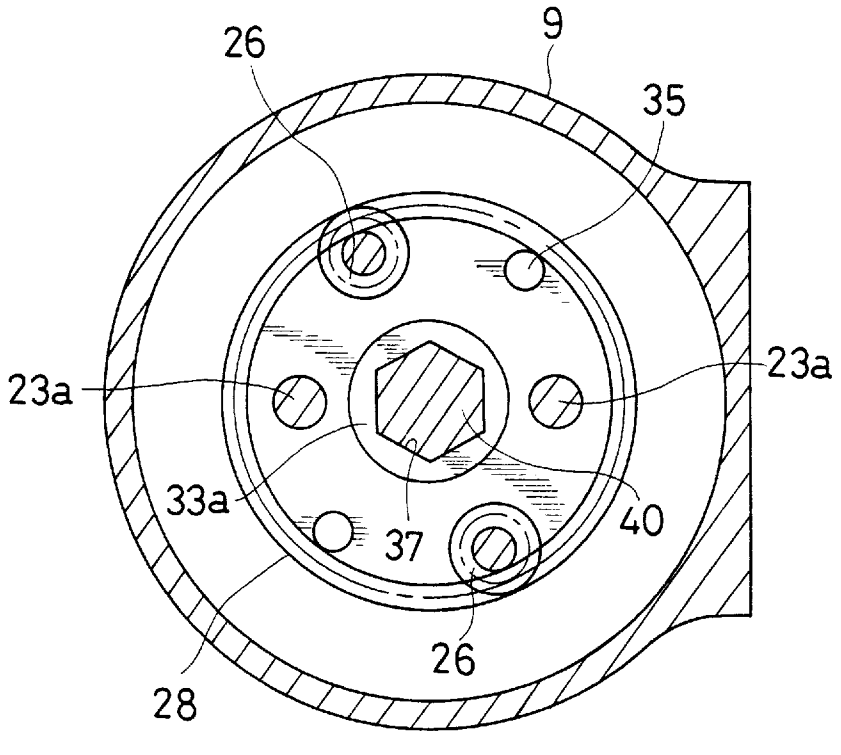
FIG. 4 is a cross section taken along a line of III—III of FIG. 1.
Figure 5:
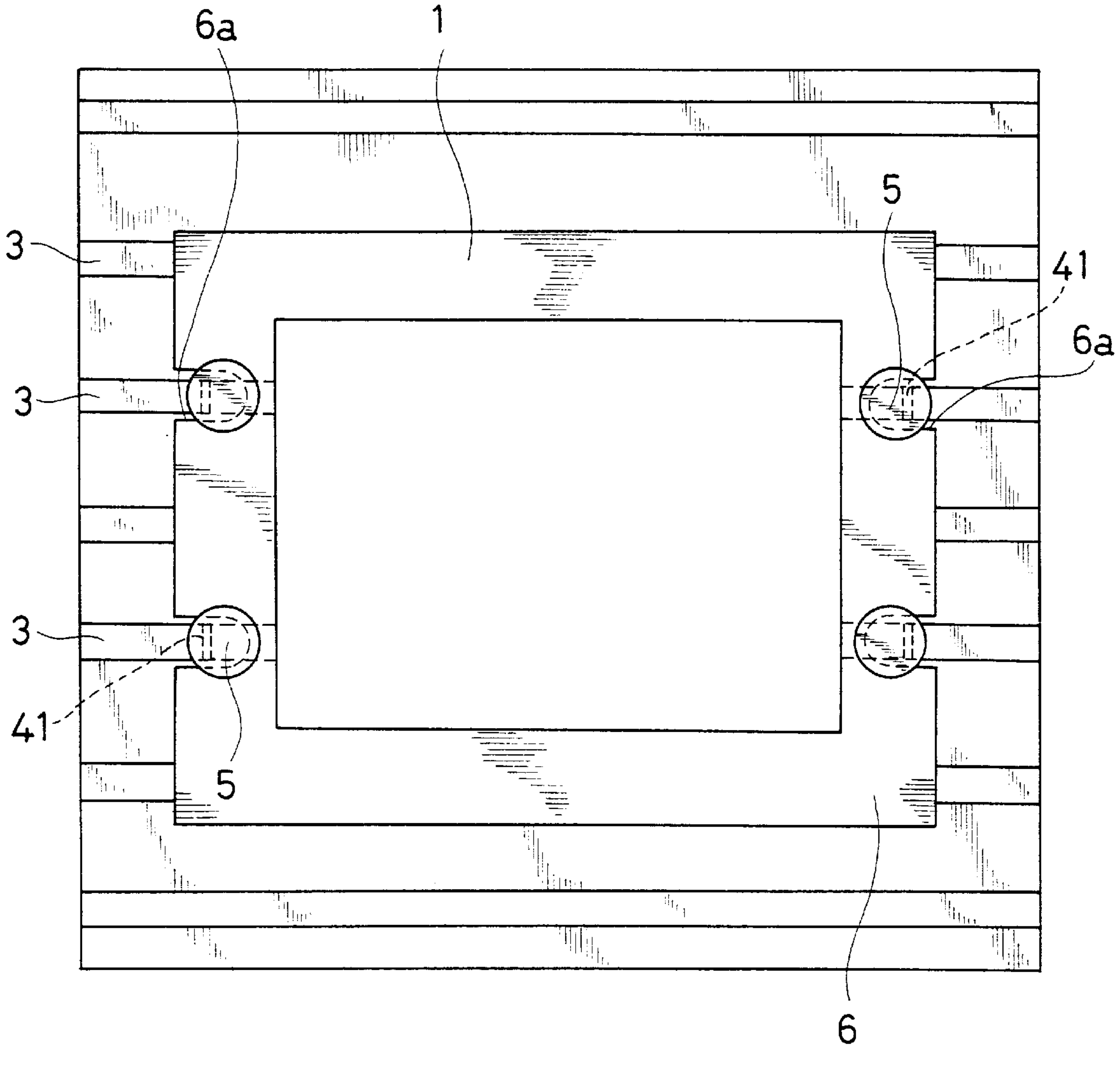
FIG. 5 is a top plan view illustrating a lower die mounted on a bolster.

FIGS. 1 to 5 illustrate a clamping apparatus in accordance with a first embodiment of the present invention, in which the clamping apparatus is employed for fixing a die mounted on a press machine or the like. In FIG. 5, a bolster 1 of the press machine defines in its upper surface a plurality of T-slots 3 which are aligned in parallel relationship with each other.

Figure 1:
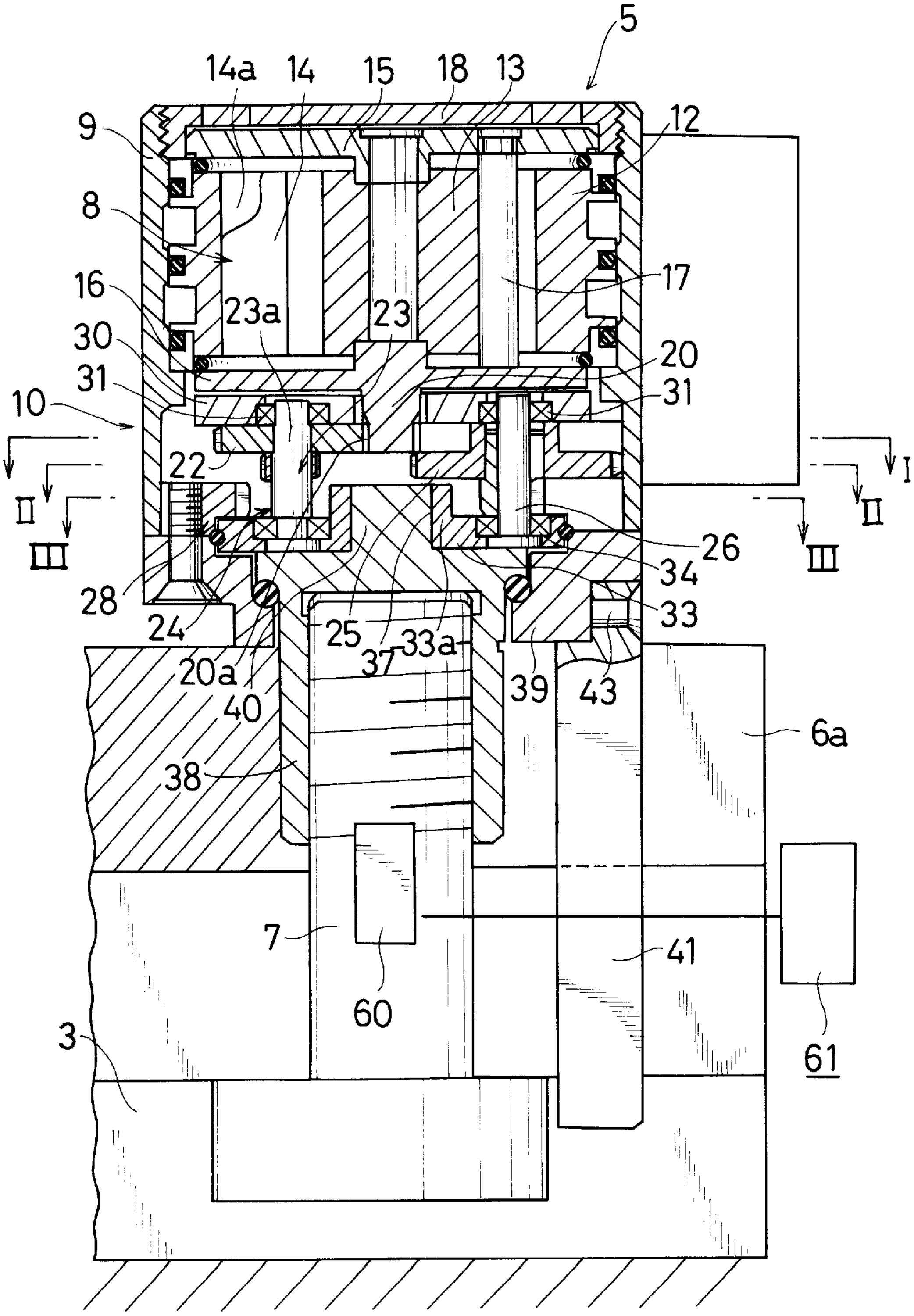
FIG. 1 is a front elevation with a cross section illustrating a clamping apparatus in accordance with a first embodiment of the present invention.
Figure 2:
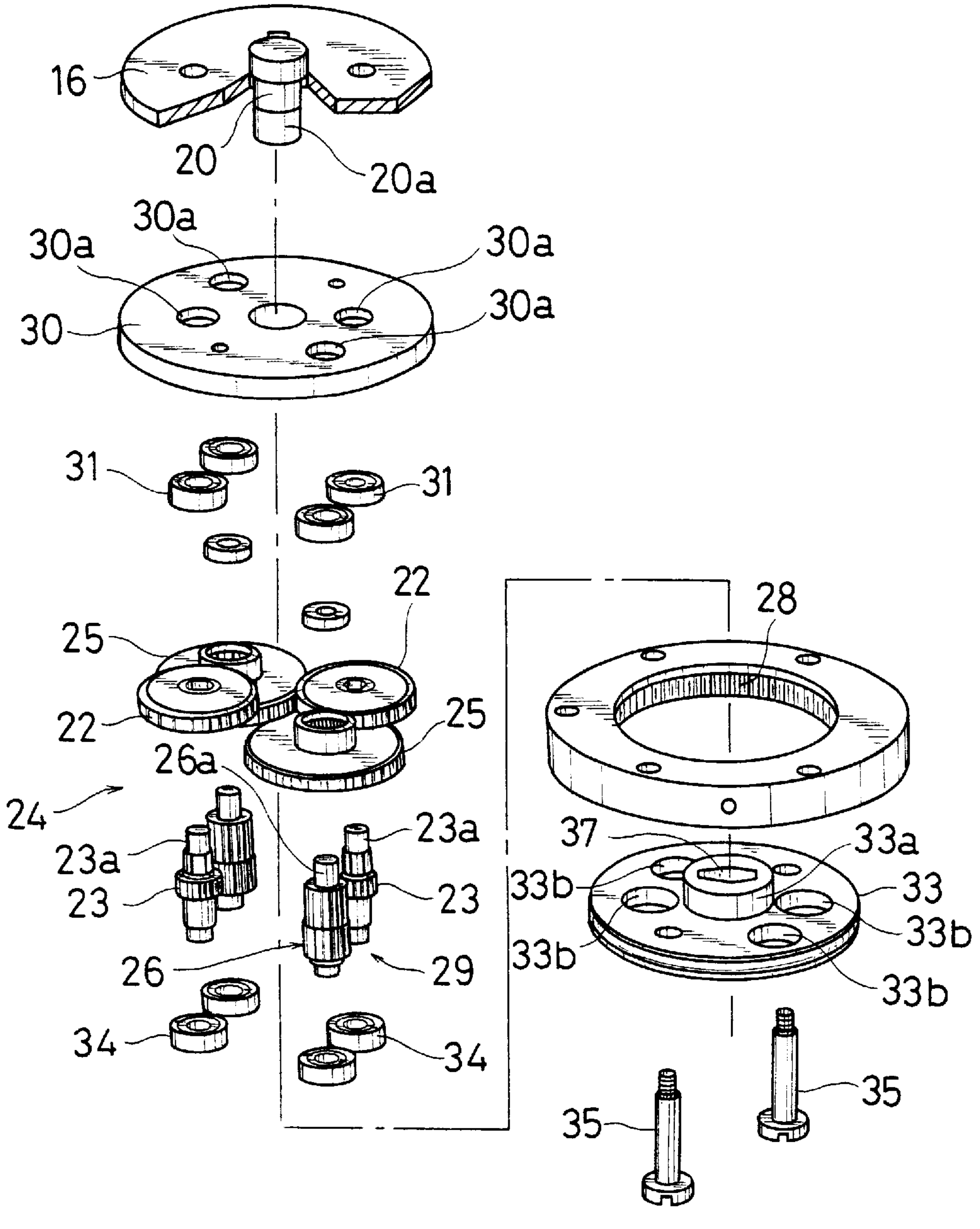
FIG. 2 is an exploded perspective view illustrating a gear reducer of the clamping apparatus of the present invention.

Four clamping apparatuses 5 are positioned at predetermined positions in such a manner as to clamp a lower die 6 mounted on the bolster 1. As illustrated in FIGS. 1 and 2, each clamping apparatuses 5 include a leg member 7, an air motor 8 mounted inside of a casing 9 and a gear reducer 10. The leg member 7 is preferably designed so that it can be inserted into the corresponding T-slot 3, but can not be rotated when it is inserted into the T-slot 3.

The air motor 8 is a conventional driving means, which includes a cylinder 12 fixed to an inner surface of the casing 9, a rotor 13 rotatably mounted within the cylinder 12, and a plurality of vanes 14 positioned around the rotor 13 in such a manner as to extend radially and outwardly from the rotor 13, and to be movable into and away from the rotor 13. An inner surface of the cylinder 12 defines a shape other than a circle in cross section. The vanes 14 each are pressed against the inner surface of the cylinder 12 via air pressure or the like. The rotor 13 is rotatable forwardly and reversely via the pressure of the compressed air which is drawn via an air inlet port (not shown) into a space 14*a* defined between the cylinder 12 and the rotor 13.

An upper plate 15, a lower plate 16 and the rotor 13 are connected together with a plurality of bolts 17 set along a circumferential direction of the rotor 13 in such a manner as to be unitedly movable. An output shaft 20 is formed at a center of a lower surface of the lower plate 16 and extends downwardly in such a manner as to be rotatable along with the rotor 13. An upper end cover 18 is screwed into an upper end of the casing 19 to seal the casing 19.

The gear reducer 10 mounted in the clamping apparatus will be discussed in detail hereinbelow.

A pair of first gear members 22 each have a larger diameter than the output shaft 20 and are meshed with teeth 20*a* formed on the output shaft 20. The both first gear members 22 are oppositely positioned with the output shaft 20 therebetween, as illustrated in FIGS. 2 and 3A. A pair of second gear members 23 each have a shaft 23*a* which is coaxially aligned with the corresponding first gear member 22 and inserted thereinto so that the first gear members 22 and second gear members 23 are unitedly movable. The diameter of the pitch circle of the second gear member 23 is set to be smaller than that of the first gear member 22. The first gear members 22 and the second gear members 25, thus, constitute a first gear speed reduction means 24.

A pair of third gear members 25 are respectively meshed with the corresponding second gear members 23. The diameter of the pitch circle of each third gear member 25 is set to be larger than that of each first gear member 22, as illustrated in FIGS. 3A and 3B.

A pair of fourth gear members 26 each have a relatively small diameter, and a shaft 26. The shafts 26 each are positioned besides the corresponding shaft 23*a* of the first gear members 22, and extend parallel to the same. The shafts 26 are respectively inserted into the corresponding third gear members 22 so that the third gear members 25 and fourth gear members 26 are unitedly movable. The diameter of the pitch circle of each fourth gear member 23 is set to be smaller than that of each third gear member 22. The fourth gear members 26 are meshed with an internal gear member 28 secured to the inner surface of the casing 9, as illustrated in FIG. 4. The third gear members 25 and the fourth gear members 26, thus, constitute a second gear reduction means 29. The first and second gear speed reduction means 24 and 25, the internal gear member 28 constitute an epicyclic gear mechanism.

An upper gear casing member 30 defines four apertures 30*a*, and bearings 31 respectively mounted inside of the apertures 30*a* for supporting the second gear members 23 and the fourth gear members 26 at the upper ends of the respective shafts 23*a* and 26*a*. A lower gear casing member 33 defines four apertures 33*b*, and bearings 34 respectively mounted inside of the apertures 33*b* for supporting the second gear members 23 and the fourth gear members 26 at the lower ends of the respective shafts 23*a* and 26*a*. The upper and lower gear casing members 30 and 33 are secured together via a plurality of fixing bolts 35 so that the first, second, third and fourth gear members 22, 23, 25 and 26 can be maintained in position for the proper gear operation.

At the center of the lower gear casing member 33 is provided a power taking-off means in the form of a boss 33*a* which defines a hexagon socket 37. A nut member 38 as a rotatable member has a downwardly facing hollowed portion defined by an cylindrical wall, an inner surface of which is threaded to allow the leg member 7 to be screwably engaged with the nut member 38 so that the leg member 7 can be moved into and away from the nut member 38 via the relative rotation of the nut member 38 and the leg member 7. On the opposite side of the nut member 38 is formed an upwardly protruding portion 40 with a hexagonal cross section so that the nut member 38 is prevented from rotating with regard to the lower gear casing member 33 by fitting into the hexagon socket 36. Thus, the nut member 38 can be rotated unitedly with the lower gear casing member 33. The nut member 38 is supported by a lower end cover 39, and is insertable into a cutout 6a defined in the lower die 6.

A stopper 41 of a rod-like shape is connected at its one end to a lower periphery of the casing 9 via a bolt 43, extends parallel to the rotational axis of the air motor 8, and is insertable into the corresponding T-slot 6 via the cutout 6*a* of the lower die 6 in such a manner as to prevent the casing 9 from rotating during the clamping operation.

In accordance with the arrangement of this embodiment, the operational steps for fixing the lower die 6 on the bolster 1 will be described hereinbelow.

The lower die 6 is first mounted on a predetermined position of the bolster 1. The leg member 7 screwably engaged in the nut member 38 is then fitted into the corresponding T-slot 3 of the bolster 1, while the nut member 38 is inserted into the corresponding cutout 6*a* of the lower die 6.

The compressed air is supplied to the air motor 8 via an air inlet port to transfer the rotational torque to the rotor 13 and rotate the same in one direction. The output shaft 20 is unitedly rotated with the rotor 13, and transfer the rotational torque to the first gear members 22 meshed therewith. Since the diameter of each first gear member 22 is larger than that of the output shaft 20 as illustrated in FIG. 3A, the rotational speed of the first gear member 22 becomes lower than that of the output shaft 20.

The rotational torque of the first gear members 22 is then transferred to the third gear members 25. Since the diameter of each third gear member 25 is larger than that of the second gear member 23 as illustrated in FIG. 3A, the rotational speed of the third gear member 25 becomes lower than that of the second gear member 23. Since the fourth gear members 26 each having a diameter smaller than that of the third gear member 25 are meshed with the internal gear member 28 secured to the inner surface of the casing 9 as illustrated in FIG. 4, the fourth gear members 26 revolve along the internal gear member 25. Thus, the upper and lower gear casing members 30 and 33 are rotated with regard to the casing 9 at predetermined reduced rotational speed.

By the rotation of the upper and lower gear casing members 30 and 33, the nut member 38 is unitedly rotated. Since the leg member 7 screwably engaged with the nut member 38 is avoided from rotating along with the nut member 38 by the engagement with the T-slot 3, the leg member 7 moves into the nut member 38 via the screwing motion. The casing 9, thus, moves towards the bolster 1, and abuts at its lower end cover 39 against the lower die 6, and consequently clamp the lower die 6 in cooperation with the bolster 1.

When the lower die 6 is to be released from the clamping state, the compressed air is supplied to the air motor 8 via another air inlet port to reversely rotate the rotor 13. The rotational torque is then transmitted to the nut member 34 via the gear reducer 10 so that the nut member 34 is rotated in the reverse direction. The leg member 7 is then moved outwardly in such a manner as to be released from the engagement with the T-slot 3. Thus, the lower die 6 can be removed from the clamped position.

Since the gear reducer 10 is of an arrangement which can reduce the rotational speed of the output shaft 20 at two stages by the first and second gear speed reduction means 24 and 29, even a single gear reducer 10 can obtain a relatively high reduction gear ratio which is conventionally attainable by connecting a plurality of the gear reducers together in line. Thus, the number of the gear reducers can be reduced, which contributes to the manufacturing of the compact clamping apparatus.

In this embodiment, an electric motor may be employed instead of the air motor 8 to rotate the output shaft 20. In addition, it is not necessary to limit the number of the gear speed reduction means to that of this embodiment. It is possible to mount more than three gear speed reduction means within the casing 9.

In this embodiment, the gear reducer 10 may includes a single gear speed reduction means, or more than two gear speed reduction means.

Second embodiment

Figure 6:
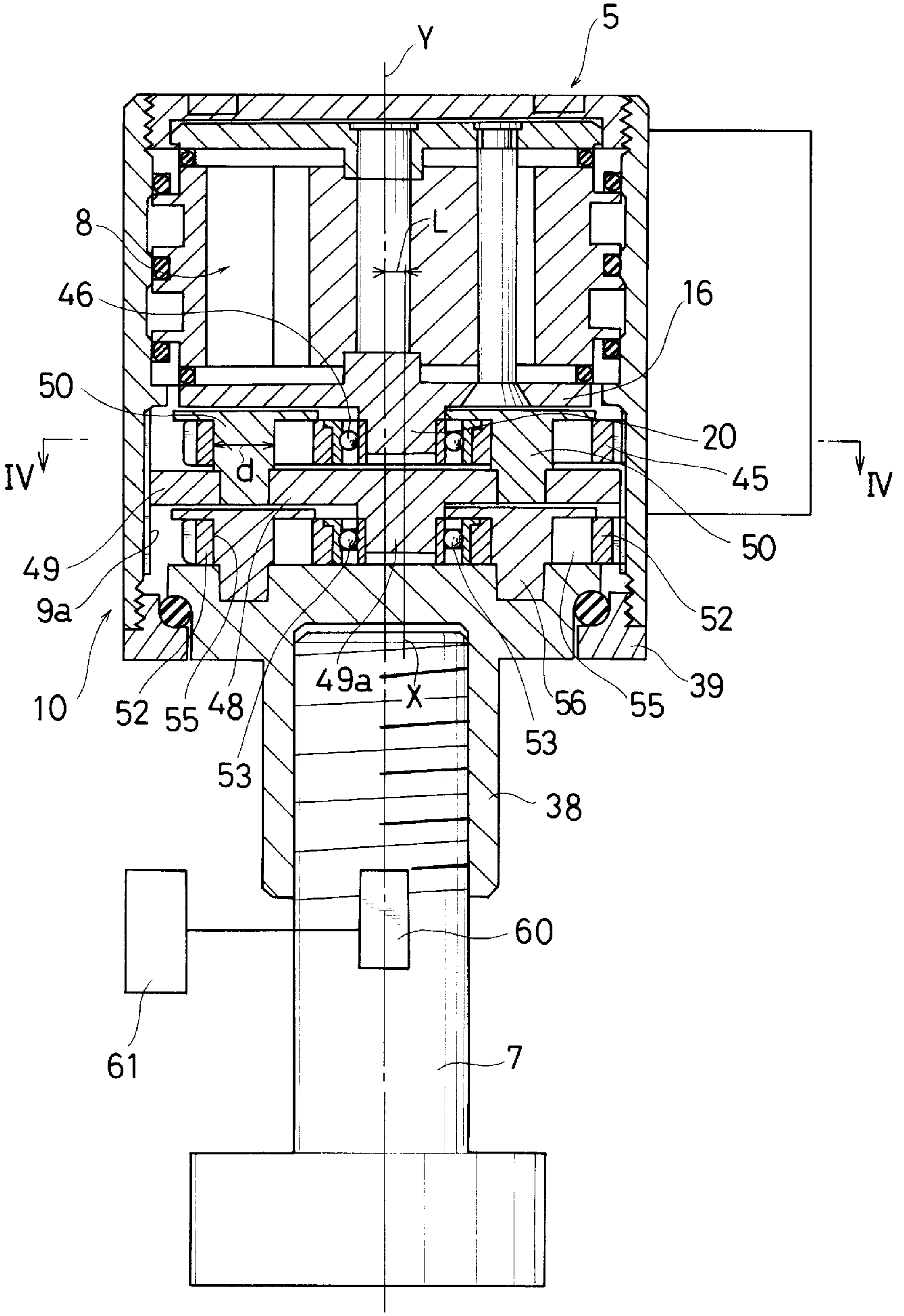
FIG. 6 is a front elevation with a cross section illustrating the clamping apparatus in accordance with a second embodiment of the present invention.
Figure 7:
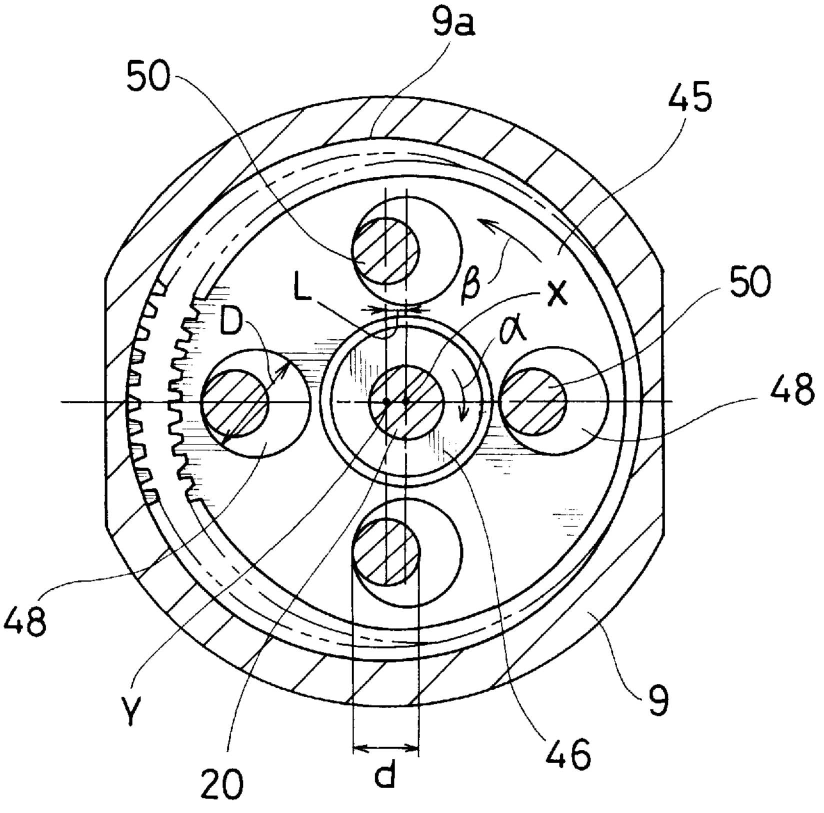
FIG. 7 is a cross section taken along a line of IV—IV of FIG. 6.

FIGS. 6 and 7 illustrate a second embodiment of the clamping apparatus of the present invention. In the following description, the same arrangements as those of the first embodiment will not be discussed in detail hereinbelow.

The output shaft 20 has the axial center X which is eccentric to the rotational axis Y of the lower plate 16. A first eccentric gear member 45 is supported by the output shaft 20 via a bearing 46 in such a manner as to be movable with regard to the output shaft 20. The first eccentric gear member 45 is eccentrically rotated via the rotation of the output shaft 20. That is, the first eccentric gear member 45 revolves around the rotational axis Y of the lower plate 16, while being in continuous meshing engagement with the internal gear member 9*a* formed on the inner surface of the casing 9.

Four apertures 48 are defined in the first eccentric gear member 45 with predetermined spacing, that is, every 90° in the circumferential direction of the gear member 45 in this case. A rotating disc 49 is positioned below the first eccentric gear member 45, and has four upward projections 50 which are respectively inserted into the apertures 48. The diameter of each aperture 48 is preferably set to be such an amount as to satisfy the following formula: $D \geqq 2 \times L + d$, in which D indicates the diameter of each aperture 48, L indicates the amount of the eccentricity of the output shaft 20, and d indicates the diameter of each upward projection 50.

The rotating disc 49 is rotatable about the rotating axis Y, and has an eccentric shaft 49*a* with the same amount of eccentricity L as that of the output shaft 20. A second eccentric gear member 52 is supported by the eccentric shaft 49*a* via a bearing 53 in such a manner as to be rotatable with respect to the eccentric shaft 49*a*. The second eccentric gear member 52 has the same shape as that of the first eccentric gear member 45, which includes four apertures 55 formed in the same manner. The nut member 38 positioned below the second eccentric gear member 45 is provided with four upward projections 56 which are respectively inserted into the apertures 55 of the second eccentric gear member 52.

In accordance with the arrangement of this embodiment, the operational steps for fixing the lower die 6 on the bolster 1 will be described hereinbelow.

The lower die 6 is first mounted on the bolster 1 in the same manner as that of the first embodiment. By the actuation of the air motor 8, the lower plate 16 is rotated so that the output shaft 20, which is eccentrically positioned with respect to the rotating axis Y of the lower plate 16, causes the first eccentric gear member 45 to eccentrically rotate in the direction of the arrow α as illustrated in FIG. 7. This eccentric movement allows the first eccentric gear member 45 to be brought into continuous meshing engagement with the internal gear member 9*a* formed on the inner surface of the casing 9.

Via the meshing engagement with the internal gear member 9*a*, the first eccentric gear member 45 is revolved in the direction of arrow β, that is, in the opposite direction to the rotational direction of the output shaft 20, at a rotational speed slower than that of the output shaft 20. It is preferable that the difference between the number of the teeth of the internal gear member 9*a* and that of the first eccentric gear member 45 is set to be as small as possible to obtain a higher reduction gear ratio. That is, the speed transferring ratio between Z1 (number of the teeth of the first eccentric gear member 45) and Z2 (number of the teeth of the internal gear member 9*a*) establishes the following relationship:

Speed transferring ratio=(Z2-Z1):Z1 Accordingly, in case of Z1=66 and Z2=72, the speed reduction ratio is 1:11.

The rotational torque of the first eccentric gear member 45 is transferred to the rotating disc 49 via the upward projections 50. Then, the second eccentric gear member 52 meshed with the internal gear member 9*a* is revolved along the internal gear member 9*a* in the direction opposite to the first eccentric gear member 45 at the same speed transferring ratio as above, that is, 1:11. Accordingly, the entire speed transferring ratio becomes 1:121.

The second eccentric gear member 52 whose speed is reduced by the above speed transferring ratio causes the nut member 38 to rotate in the same direction as that of the output shaft 20, and the leg member 7 screwably engaged with the nut member 38 to press the lower die 6 from above and fix the same on the bolster 1.

In this embodiment, by providing the first and second eccentric gear members 45 and 52, the nut member 38 is rotated in the same direction as that of the air motor 8. However, when the nut member 38 is to be rotated in the opposite direction to that of the air motor 8, it is possible to omit the second eccentric gear member 52, and rotate the nut member 38 directly by the rotating disc 49.

The internal gear member 9*a* may be integrally formed with the casing 9, or may be separately formed. In addition, a plurality of the internal gear members 9*a* may be provided in such a manner as to be respectively meshed with the first and second eccentric gear members 45 and 52.

During the lower die 6 is subjected to the fastening force via the leg member 7 and the lower surface of the lower end cover 39, the leg member 7 is subjected to the tension force, which force causes strain over the leg member 7. The fastening force of the lower die can be observed by sensing the magnitude of the strain caused in the direction of the tension force applied on the leg member 7. The strain can be sensed by a strain gauge 60 mounted on the leg member 7 as illustrated in FIGS. 1 and 6. In accordance with this sensing means, it is possible to control air flow via a controlling unit for controlling a valve provided on a distributing pipe connected between the clamping apparatus and an air source such as a compressor pre-installed in a factory, so that the air is supplied to the air motor 8, and consequently a predetermined magnitude of the fastening force can be obtained to properly clamp the work piece.

In accordance with the conventional clamping apparatus with the impact mechanism, the clamping apparatus is likely to be greatly vibrated via the impact. Such vibration may hesitate the strain gauge 60 from exactly sensing the magnitude of the strain. On the contrary, since the clamping apparatus of the present invention includes the gear reducer, it is unlikely to cause such vibration, and is suitable for protecting the strain gauge 60 against vibration or the like which may occur during the clamping operation.

It is possible to control the pressure of the supplied air so that the output shaft 20 of the air motor 8 can be stopped, for example, at the time that the air motor 8 is subjected to the excessive load.

In accordance with the clamping apparatus of the present invention, the operator's work load for the fixture and release of the work piece can be reduced as compared with the conventional manner, in which the operator clamps the work piece by tightening a bolt and a nut with a hand tool such as a spanner. This contributes to the increase of the production efficiency.

The gear mechanism of the clamping apparatus of the present invention can avoid the disadvantages which are inherently associated with the conventional impact type clamping apparatus, namely, the noise, damage, abrasion, etc., caused by the impact. Thus, the clamping apparatus of the present invention can be used for a prolonged period of time.

As discussed above, the clamping apparatus of the present invention can compactly be manufactured so that it can easily be installed even in a limited space without the blocking by the lower die or the like.

This specification is by no means intended to restrict the present invention to the preferred embodiments set forth therein. Various modifications to the inventive clamping apparatus, as described herein, may be made by those skilled in the art without departing from the spirit and scope of the present invention.

What is claimed is:

1. A clamping apparatus for clamping a work piece on a mounting table comprising:

a driving means mounted inside of a casing;

a gear reducer connected to an output shaft of said driving means for reducing a rotational speed of the driving means;

a rotatable member being rotatable by a power taking-off means connected to said gear reducer; and a detent member screwably engaged with a rotatable member, in which said detent member is movable into and away from said rotatable member by the rotation of the rotatable member to clamp the work piece in cooperation with the mounting table at the time of that said detent member is fixed to the mounting table so as not to be rotated by the rotation of the rotatable member.

2. A clamping apparatus as set forth in claim 1, wherein said gear reducer comprises a first gear reduction means meshed with said output shaft so that said first gear reduction means rotates at a speed lower than said output shaft; and a second gear reduction means meshed with said first gear reduction means so that said second gear reduction means rotates at a speed lower than said first gear reduction means, in which the rotational torque of said second gear reduction means is transferred to said power taking-off means.

3. A clamping apparatus as set forth in claim 2, wherein said first gear reduction means includes:

a first gear member meshed with a threaded portion of said output shaft and a second gear member with a diameter smaller than that of said first gear member which is unitedly rotatable with said first gear member, said first gear member having a diameter larger than that of said output shaft;

said second gear reduction means includes a third gear member meshed with said second gear member and a fourth gear member having a diameter smaller than that of said third gear member which is unitedly rotatable with said third gear member, said third gear member having a diameter larger than said second gear member;

said first, second, third and fourth gear members mounted within a gear casing, and said fourth gear member meshed with an internal gear member fixed to said casing so that said gear casing is rotatable by the rotation of the output shaft; and said gear casing is provided with said power taking-off means.

4. A clamping apparatus as set forth in claim 3, wherein said power taking-off means provided on said gear casing is a boss, through which the rotational torque of said gear casing is transferred to the rotatable member.

5. A clamping apparatus as set forth in claim 3, wherein said second gear member is inserted into said first gear member, said fourth gear member is inserted into said third gear member, said gear casing includes an upper gear casing member for supporting upper ends of a shaft of said second gear member and said fourth gear member and a lower gear casing member for supporting lower ends of said shaft of said second gear member and said fourth gear member.

6. A clamping apparatus as set forth in claim 2, wherein said gear reducer is an epicyclic gear mechanism which includes a first gear member having a diameter larger than that of said output shaft for receiving the rotational torque of the output shaft, a second gear member having a diameter smaller than said first gear member, said second gear member being rotatable unitedly with said first gear member, and an internal gear member fixed to said casing and meshed with said second gear member;

said first and second gear members are mounted to a gear casing so that said gear casing is rotatable by the rotation of said output shaft; and said gear casing is provided with said power taking-off means.

7. A clamping apparatus as set forth in claim 1, wherein said output shaft is eccentrically positioned with regard to an axial center Y of said driving means; and said gear reducer includes an eccentric gear member being supported by said output shaft in such a manner as to be rotatable with regard to said output shaft, an internal gear member being fixed to said casing so that said eccentric gear member can be in continuous meshing engagement with the internal gear member and revolved along the internal gear member, wherein the rotational torque of said eccentric gear member is transferred to said rotatable member.

8. A clamping apparatus as set forth in claim 1, wherein said output shaft is eccentrically positioned with regard to an axial center Y of said driving means; and said gear reducer includes a first eccentric gear member being supported by said output shaft in such a manner as to be rotatable with regard to said output shaft, an internal gear member being fixed to said casing so that said first eccentric gear member can be in continuous meshing engagement with the internal gear member and revolved along said internal gear member, and a rotating disc being rotatable around the axial center Y in the rotational direction opposite to that of said output shaft at a speed lower than said output shaft by the rotation of said first eccentric gear member, and a second eccentric gear member being supported by an eccentric shaft being eccentric to said rotating disc in such a manner as to be rotatable with regard to said eccentric shaft, wherein the rotational torque of said second eccentric gear member is transferred to said power taking-off means.

9. A clamping apparatus as set forth in claim 7, wherein said eccentric gear member defines at least one aperture, through which projections respectively protruding from said rotatable member are inserted so that said rotatable member can be rotated via the engagement between said apertures and said projections by the rotation of said eccentric gear member, in which the diameter of said aperture is set to be such an amount as to satisfy the following formula: $D \geqq 2\times L+d$, in which D indicates the diameter of said aperture, L indicates the amount of the eccentricity of the output shaft, and d indicates the diameter of said projection.

10. A clamping apparatus as set forth in claim 1, wherein said output shaft is eccentrically positioned with regard to an axial center Y of said driving means;

said gear reducer includes a plurality of eccentric gear members each having at least one aperture, a plurality of connecting means respectively interposed between said adjacent eccentric gear members, said connecting means each having, at one surface, protrusions being respectively insertable into said apertures of said eccentric gear member adjacent to said surface of said connecting means, and, at an opposite surface of said connecting means an eccentric shaft for supporting said eccentric gear member adjacent to said opposite surface of said eccentric gear member in such a manner as to be rotatable with regard to said eccentric gear member; and said rotatable member having at its surface adjacent to said eccentric gear member protrusions being insertable into said apertures of said eccentric gear member so that the rotational torque of said output shaft can be transferred to said rotatable member via said eccentric gear members and said connecting means at a speed lower than that of said output shaft.

11. A clamping apparatus as set forth in claim 10, wherein the diameter of each of said apertures of each eccentric gear member is set to be such an amount as to satisfy the following formula: $D \geqq 2\times L+d$, in which D indicates the diameter of said aperture, L indicates the amount of the eccentricity of the output shaft, and d indicates the diameter of the corresponding projection.

12. A clamping apparatus as set forth in claim 1, wherein said rotatable member has a cylindrical hollow portion which opens outwardly, and an inner surface of a wall defining said cylindrical hollow forms a threaded portion, with which a threaded portion formed on a surface of said detent member is screwably engaged.

13. A clamping apparatus for clamping a work piece on a mounting table comprising:

a driving means mounted inside of a casing;

an output shaft being eccentrically positioned with regard to a axial center Y of said driving means;

a first eccentric gear member defining at least one aperture therein and being supported by said output shaft in such a manner as to be rotatable with regard to said output shaft;

an internal gear member being fixed to said casing so that said first eccentric gear member can be in continuous meshing engagement with the internal gear member and revolved along the internal gear member;

a rotating disc having protrusions protruding from a surface facing said first eccentric gear member and being respectively inserted into said apertures of said first eccentric gear member in such a manner as to be rotatable around the axial center Y of said driving means in the rotational direction opposite to that of said output shaft at a speed lower than said output shaft via the engagement between said apertures and said protrusions by the rotation of said output shaft, and said rotating disc having an eccentric shaft protruding from an opposite surface thereof, wherein the diameter of each of said aperture of said first eccentric gear member is set to be such an amount as to satisfy the following formula: $D \geqq 2\times L+d$, in which D indicates the diameter of said aperture, L indicates the amount of the eccentricity of the output shaft, and d indicates the diameter of said projection;

a second eccentric gear member defining at least one aperture therein and being supported by said eccentric shaft in such a manner as to be rotatable with regard to said eccentric shaft and being in continuous meshing engagement with said internal gear member;

a rotatable member having at its surface facing said second eccentric gear member protrusions which are respectively inserted into said apertures of said second eccentric gear member in such a manner as to be rotatable around the axial center Y of said driving means in the rotational direction opposite to that of said eccentric shaft at a speed lower than said eccentric shaft via the engagement between said apertures and said protrusions by the rotation of said eccentric shaft, in which the diameter of each of said apertures is set to be such an amount as to satisfy the following formula: $D \geqq 2\times L+d$, in which D indicates the diameter of said aperture, L indicates the amount of the eccentricity of the output shaft, and d indicates the diameter of said projection; and said rotatable member having a cylindrical hollow portion which opens outwardly, and an inner surface of a wall defining said cylindrical hollow forms a threaded portion, with which a threaded portion formed on a surface of said detent member is screwably engaged.

* * * * *